Aug. 19, 1958  G. L. WESTBY  2,847,795
ANIMAL TRAP SPRING SUSPENSION
Filed May 28, 1957
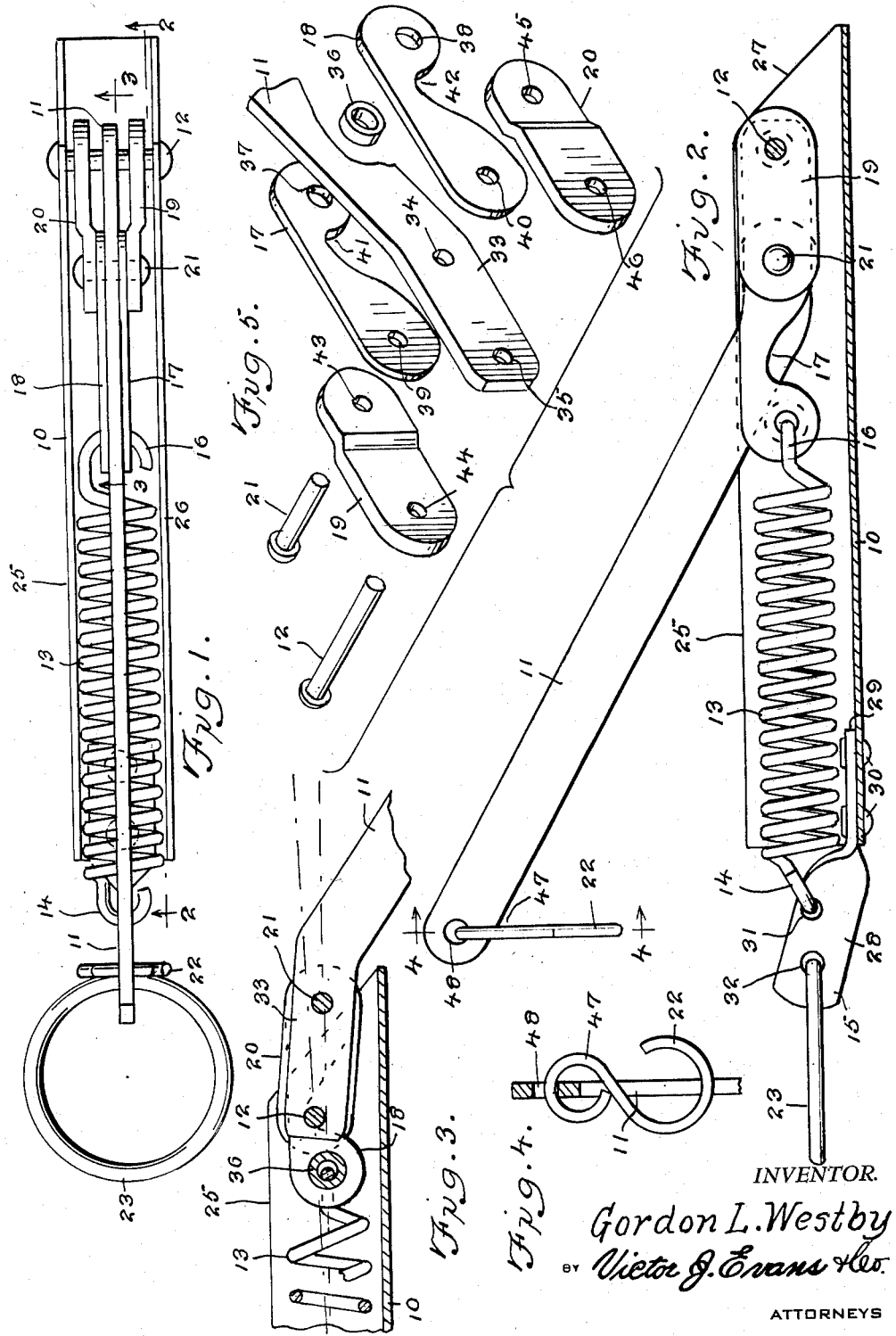
INVENTOR.
Gordon L. Westby
BY Victor J. Evans & Co.
ATTORNEYS

United States Patent Office 2,847,795
Patented Aug. 19, 1958

2,847,795

ANIMAL TRAP SPRING SUSPENSION

Gordon L. Westby, Deerfield, Wis.

Application May 28, 1957, Serial No. 662,154

4 Claims. (Cl. 43—96)

This invention relates to trapper's equipment particularly such as used for animals frequenting the shores of lakes and streams or at the water's edge and in particular a spring arrangement providing a resilient element in an anchoring connection of a trap whereby an animal is drawn into deep water to expedite drowning and wherein escape of animals due to breaking of legs is eliminated.

The purpose of this invention is to provide a cushioning element having a trip connection in combination therewith whereby with the device inserted in an anchoring connection of a trap an animal is drawn toward deep water upon springing of the trip connection and whereby resiliency is provided in the anchoring means of a trap.

Animal traps are anchored by chains, cables, and other means to stakes, posts, and the like and in attempting to free themselves from the trap the animal places considerable strain on the anchoring connection resulting in breaking their legs and sometimes in breaking the traps whereby the animal is freed. With this thought in mind this invention contemplates a resilient element incorporated in an anchoring connection whereby the shock load resulting from the animal reaching the end of an anchoring connection is absorbed by the resilient element.

The object of this invention is, therefore, to provide means for obtaining a cushioning action in an anchoring connection of an animal trap whereby shock loads which cause breaking of animal appendages and also of parts of traps is obviated.

Another object of the invention is to provide a cushioning element for anchoring connections of animal traps wherein means is provided for retracting a trap with an animal therein from one position to another.

A further object of the invention is to provide a cushioning device for anchoring connections of animal traps in which the device is readily installed and in which the device is of a simple and economical construction.

With these and other objects and advantages in view the invention embodies a channel-shaped base having an anchor connecting ring carried by a bracket extended from one end, a spring in the base positioned with one end connected to the bracket and the other to a link and a lever to which the link is pivotally connected pivotally mounted in the base and designed to be drawn to an over the center position wherein the device is cocked, and with the device in the cocked position the lever is connected to a trap by a link, chain, or the like.

Other features and advantages of the invention will appear from the following description taken in connection with the drawing, wherein:

Figure 1 is a plan view of the improved spring suspension unit showing the spring in the released position.

Fig. 2 is a longitudinal section through the suspension unit taken on line 2—2 of Fig. 1 also showing the spring in the released position.

Figure 3 is a longitudinal section showing a portion of the end of the channel-like base with the lever in the cocked position wherein the spring is extended and showing the relative positions of the pivot points whereby the point of connection of a link to which the spring is connected to the lever is below the center of the pivotal mounting of the lever, said section being taken on line 3—3 of Fig. 1.

Figure 4 is a cross section taken on line 4—4 of Fig. 2 showing a hook for connecting the end of the lever to a chain extended from a trap or the like.

Figure 5 is an exploded view illustrating the relative positions of the links connecting the spring to the lever.

Referring now to the drawing wherein like reference characters denote corresponding parts the improved spring suspension of this invention includes a channel-shaped base 10, a lever 11 pivotally mounted by a pin 12 in the end of the base, a spring 13 positioned in the base, one end 14 of which is connected to a bracket 15 and the opposite end 16 of which is connected to links 17 and 18 which are pivotally connected to the lever 11 and also to offset links 19 and 20 by a pin 21, a hook 22 for connecting the end of the lever 11 to a trap, and a ring 23 carried by the bracket 15 for connecting the device to an anchor, such as a stake, or the like.

The base 10 is provided with side walls 25 and 26 and the ends of the walls, at one end of the base are provided with beveled surfaces 27.

The bracket 15 is formed of a strip of material, twisted to an angle of 90° at the point 28 and one end of the bracket, as indicated by the numeral 29 is secured to the base 10 with fasteners, such as the rivets 30. The opposite end of the bracket is provided with an opening 31 in which the end 14 of the spring 13 is positioned, and also with an opening 32 in which the ring 23 is positioned.

The lever 11 is provided with a bent end 33 whereby with the lever in the cocked position the end 33 is positioned in the end of the base with the lever 11 extended downwardly, as illustrated in Fig. 3. The lever is provided with an opening 34 through which the pin 21 extends, and an opening 35 through which the pin 12 extends, and a ring 36 is positioned below the edge of the lever, with the lever in the position shown in Fig. 2 whereby the end 16 of the spring extends through the ring and also through openings 37 and 38 in the links 17 and 18. The opposite ends of the links 17 and 18 are provided with openings 39 and 40 to receive the pin 21 and lower edges of the links are provided with notches 41 and 42.

The offset link 19 is provided with an opening 43 that is positioned to receive the pin 21 and also with the opening 44 through which the pin 12 extends and the offset link 20 is provided with similar openings with an opening 45 positioned to receive the pin 21 and an opening 46 that is positioned to receive the pin 12.

The bent end 33 of the lever 11 is pivotally mounted by the pin 12 in the sides 25 and 26 of the base with the pin extending through the opening 35 in the end of the lever and also through openings 44 and 46 of the links 19 and 20 whereby with the pin 21 through the opening 34 of the lever, the openings 39 and 40 of the links 17 and 18 and the openings 43 and 45 of the links 19 and 20 the parts are connected whereby the end 16 of the spring 13 extended through the openings 37 and 38 of the links 17 and 18, a pin 21 passes over the center as the lever 11 is turned over from the position shown in Figure 2 to that shown in Figure 3 whereby, as indicated by the broken lines the pin 21 is below the center of the pivot pin 12 and the end of the lever 11 is connected to a trap whereas the ring 26 at the opposite end of the device is connected to a stake or anchor in deep water.

The struggling of an animal in the trap connected to the end of the lever 11 causes the lever to move upwardly as the pin 21 passes over the center a spring, pulling on the lever through the links 17 and 18 moves the lever 11 back to the position shown in Figure 2, pulling the trap with an animal therein into deep water so that the animals are drowned or will not have sufficient footing to fight the trap.

By this means a spring suspension is provided wherein with the lever 11 in the cocked position, as shown in Fig. 3 an animal, caught in a trap connected by the hook 22, which is provided with an eye 47 that extends through an opening 48 in the end of the lever 11, is drawn forwardly by the spring 13 as the end of the lever 11 is drawn upwardly with the pin 21 passing over the center of the pin 12 whereby the animal may be drawn into deeper water and with this unit inserted in the anchoring means of the trap breakage of animal appendages due to snap loads resulting from an animal running or jumping to the end of a chain or cable is substantially eliminated.

With this simple over the center trip release which is actuated by a struggling animal the animal is readily drawn into deep water and drowned, thereby overcoming the greatest percentage of loss. The greatest percentage of loss being due to animals remaining alive in traps whereby the animals break the leg bone and twist off tissue making escape possible resulting in infection and loss. Live animals struggling in traps also attract thieves and prowlers which kill the animal, eating part thereof and destroying the value of the pelt.

It will be understood that modifications, within the scope of the appended claims, may be made in the design and arrangement of the parts without departing from the spirit of the invention.

What is claimed is:

1. A resilient unit for use in a connection of an animal trap to an anchor comprising an elongated base channel-shaped in cross section having anchor connecting means on one end, a lever pivotally mounted in the end of the base opposite to the end in which the anchor connection is provided, trap connecting means in the extended end of the lever, a spring in the base positioned with one end connected to the base, and links connecting the opposite end of the spring to the lever whereby in the cocked position of the unit the pivotal connection of the links to the lever is over the center of the pivotal mounting of the lever in the base, and whereby motion in a trap connected to the lever moves the connection of the lever to the links across the center of the pivotal connection of the lever to the base whereby the lever is drawn to a retracted position by the spring.

2. A spring suspension for use in an anchor connection of a trap comprising an elongated channel-shaped base having a bracket extended from one end, a ring in the bracket for connecting the base to an anchor, a lever pivotally mounted in the end of the base opposite to that on which the bracket is positioned, trap connecting means in the extended end of the lever, a spring positioned in the base with one end connected to the base, links connecting the opposite end of the spring to the lever at a point positioned over the center of the pivotal connection of the lever to the base with the lever in the cocked position, and whereby motion in a trap connected to the lever moves the connection of the lever to the links across the center of the pivotal connection of the lever to the base whereby the lever is drawn to a retracted position by the spring.

3. In a spring suspension for use in an anchor connection of an animal trap, the combination which comprises an elongated base, channel-shaped in cross section having a bracket extended from one end, a ring freely mounted in the bracket, a lever having an end bent to an angle less than a right angle from one end positioned with the bent end pivotally mounted in the base, trap connecting means in the extended end of the lever, the pivotal mounting of the lever in the base being in the end opposite to the end on which the bracket is positioned, links pivotally connected to the bent end of the lever and a spring in the base and positioned with one end connected to the bracket and the other to said links whereby a line through the connection of the spring to the links and also through the pivotal connection of the links to the lever is positioned below the pivotal mounting of the bent end of the lever in the base with the lever in the cocked position, and whereby motion in a trap connected to the lever moves the connection of the lever to the links across the center of the pivotal connection of the lever to the base whereby the lever is drawn to a retracted position by the spring.

4. In a spring suspension for a connection of an animal trap to an anchor, the combination which comprises an elongated base, channel-shaped in cross section having a base portion with upwardly extended side walls, a bracket extended from one end of the base, a ring pivotally mounted in an opening through the bracket, a pin extended through the end of the base opposite to the end on which the bracket is positioned and mounted in the side walls thereof, a lever having a bent end pivotally mounted on the pin mounted in the side walls of the base, a pin extended through the lever and spaced from the pin pivotally mounting the bent end of the lever in the base, offset links extended between the pin pivotally mounted in the lever and the pin mounted in the side walls of the base, links pivotally mounted on the pin extended through the lever and spaced from the pin extended through the side walls of the base, a spring in the base and positioned with one end connected to the bracket and the other to the links pivotally mounted on the pin extended through the lever and a hook in the extended end of the lever for connecting the extended end of the lever to an animal trap.

References Cited in the file of this patent
UNITED STATES PATENTS 2,483,881     Cole                  Oct. 4, 1949